(12) United States Patent
Ballani et al.

(10) Patent No.: US 9,727,383 B2
(45) Date of Patent: Aug. 8, 2017

(54) PREDICTING DATACENTER PERFORMANCE TO IMPROVE PROVISIONING

(75) Inventors: Hitesh Ballani, Cambridge (GB); Thomas Karagiannis, Cambridge (GB); Antony Rowstron, Cambridge (GB); Paolo Costa, Cambridge (GB); Virajith Jalaparti, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/400,579

(22) Filed: Feb. 21, 2012

(65) Prior Publication Data

US 2013/0219068 A1 Aug. 22, 2013

(51) Int. Cl.
*G06F 15/16* (2006.01)
*G06F 15/177* (2006.01)
(Continued)

(52) U.S. Cl.
CPC ......... *G06F 9/5061* (2013.01); *G06F 9/5044* (2013.01); *G06Q 10/063* (2013.01); *G06F 2209/508* (2013.01)

(58) Field of Classification Search
CPC ............. G06F 11/3495; G06F 11/3428; G06F 9/5072; G06F 11/3051; G06F 11/3433; G06F 11/3442; G06F 11/3447; G06F 2201/86; G06F 2201/875; H04L 29/08144; H04L 41/0883; H04L 41/5009; H04L 41/5025; H04L 41/5041; H04L 41/5096; H04L 43/16; Y02B 60/142; Y02B 60/167

(Continued)

(56) References Cited

U.S. PATENT DOCUMENTS 7,987,262 B2 * 7/2011 Tung ............... G06F 9/5072
  709/217
8,214,194 B2 * 7/2012 Bank ................ G06F 11/3428
  703/22

(Continued)

OTHER PUBLICATIONS

Wieder et al. ("Conductor: Orchestrating the Clouds", Proc. of LADIS, 2010. Published Jul. 2010. Item #5 of IDS filed on Feb. 21, 2012).*

(Continued)

*Primary Examiner* — Edward Kim

(57) ABSTRACT

Methods of predicting datacenter performance to improve provisioning are described. In an embodiment, a resource manager element receives a request from a tenant which describes an application that the tenant wants executed by a multi-resource, multi-tenant datacenter. The request that has been received is mapped to a set of different candidate resource combinations within the datacenter, where each candidate resource combination can be used to execute the application in a manner which satisfies a high level constraint specified within the request. This mapping may, for example, be performed using a combination of benchmarking and an analytical model. In some examples, each resource combination may comprise a number of virtual machines and a bandwidth between those machines. Data relating to at least a subset (and in some examples, two or more) of the candidate resource combinations is then presented to the tenant.

19 Claims, 8 Drawing Sheets

(51) Int. Cl.
*G06F 9/50* (2006.01)
*G06Q 10/06* (2012.01)

(58) Field of Classification Search
USPC .............. 709/201–203, 220–222, 224–226
See application file for complete search history.

(56) References Cited

U.S. PATENT DOCUMENTS

| | | | | |
|---|---|---|---|---|
| 8,365,184 | B2* | 1/2013 | Carter | G06F 11/3419 |
| | | | | 702/182 |
| 8,473,615 | B1* | 6/2013 | Rowland | G06F 9/5077 |
| | | | | 709/221 |
| 2009/0276787 | A1* | 11/2009 | Banks | G06F 11/3428 |
| | | | | 718/105 |
| 2010/0076856 | A1 | 3/2010 | Mullins | |
| 2010/0274637 | A1* | 10/2010 | Li | G06Q 10/06 |
| | | | | 379/265.06 |
| 2010/0332401 | A1 | 12/2010 | Prahlad et al. | |
| 2011/0145392 | A1 | 6/2011 | Dawson et al. | |
| 2011/0161973 | A1 | 6/2011 | Klots et al. | |
| 2011/0225299 | A1 | 9/2011 | Nathuji et al. | |
| 2011/0276686 | A1 | 11/2011 | Tung et al. | |
| 2011/0295999 | A1* | 12/2011 | Ferris | G06F 9/5072 |
| | | | | 709/224 |
| 2013/0055250 | A1* | 2/2013 | Pechanec | G06F 11/3428 |
| | | | | 718/1 |

OTHER PUBLICATIONS

Li et al. ("CloudCmp: comparing public cloud providers", IMC 2010. Published Nov. 2010. Item #6 of IDS filed on Feb. 21, 2012).*
Chantry, Darryl, "Mapping Applications to the Cloud", Published on: Jan. 2009, Available at: http://msdn.microsoft.com/en-us/library/dd430340.aspx.
Harms, et al., "The Economics of the Cloud", Published on: Nov. 2010, Available at: http://www.microsoft.com/windowsazure/Whitepapers/CloudEconomics/.
Armburst et al., "Above the Clouds: A Berkeley View of Cloud Computing," University of California, Berkeley, Tech. Rep., 2009, Published on: Feb. 10, 2009 Available at: http://www-users.cselabs.umn.edu/classes/Fall-2010/csci8980-cloud/papers/Berkeley_Cloud_Computing_EECS-2009-28.pdf.
Ballani et al., "Towards Predictable Datacenter Networks," in Proc. of SIGCOMM, 2011, Published on: Aug. 2011 Available at: http://research.microsoft.com/en-us/um/people/hiballan/pubs/sigcomm11-oktopus.pdf.
Wieder et al., "Conductor: Orchestrating the Clouds," in Proc. of LADIS, 2010. Published on: Jul. 2010 Available at: http://www.mpi-sws.org/~rodrigo/conductor-ladis2010.pdf.
Kambatla et al., "Towards Optimizing Hadoop Provisioning in the Cloud," in HotCloud, 2009. Published on: Jun. 2009 Available at: http://web.ics.purdue.edu/~pathaka/papers/2009-hotcloud-karthik.pdf.
Herodotou et al., "No One (Cluster) Size Fits All: Automatic Cluster Sizing for Data-intensive Analytics," in ACM SOCC, 2011. Published on: Oct. 2011 Available at: http://prophet.cs.duke.edu/~hero/files/socc11-cluster-sizing.pdf.
Li et al., "CloudCmp: comparing public cloud providers," in IMC, 2010. Published on: Nov. 2010 Available at: http://www.cs.duke.edu/~angl/papers/imc10-cloudcmp.pdf.
Schad et al., "Runtime measurements in the cloud: observing, analyzing, and reducing variance," in Proc. of VLDB, 2010. Published on: Sep. 2010 Available at: http://www.vldb2010.org/proceedings/files/papers/E02.pdf.
Mangot, "Measuring EC2 system performance," Published on: May 2009 Available at: http://bit.ly/48Wui.
Iosup et al., "On the Performance Variability of Production Cloud Services," Delft University of Technology, Tech. Rep. PDS-2010-002, Jan. 2010. Published on: Jan. 2010 Available at: http://www.pds.ewi.tudelft.nl/~iosup/tech_rep/cloud-perf-var10tr.pdf.
Zaharia et al., "Improving MapReduce Performance in Heterogeneous Environments," in Proc. of OSDI, 2008. Published on: Aug. 2008 Available at: http://bnrg.cs.berkeley.edu/~adj/publications/paper-files/EECS-2008-99.pdf.
Walker, "Benchmarking Amazon EC2 for high-performance scientific computing," Usenix Login, Oct. 2008. Available at: http://www.usenix.org/publications/login/2008-10/openpdfs/walker.pdf.
He et al., "Case study for running HPC applications in public clouds," in HPDC, 2010. Published on: Jun. 2010 Available at: http://datasys.cs.iit.edu/events/ScienceCloud2010/p04.pdf.
Soares et al., "Gatekeeper: Distributed Rate Control for Virtualized Datacenters," HP Labs, Tech. Rep. HP-2010-151, 2010. Published on: Oct. 2010 Available at: https://www.hpl.hp.com/techreports/2010/HPL-2010-151.pdf.
Guo et al., "SecondNet: A Data Center Network Virtualization Architecture with Bandwidth Guarantees," in Proc. of ACM CoNext, 2010. Published on: Nov. 2010 Available at: http://www.stanford.edu/~shyang/Site/home_files/15-Guo.pdf.
Gulati et al., "PARDA: proportional allocation of resources for distributed storage access," in Proc. of Usenix FAST, 2009. Published on: Feb. 2009 Available at: http://citeseerx.ist.psu.edu/viewdoc/download?doi=10.1.1.188.3027&rep=rep1&type=pdf.
Karlsson et al., "Triage: Performance differentiation for storage systems using adaptive control," ACM Trans. Storage, vol. 1, 2005. Published on: Nov. 2005 Available at: http://citeseerx.ist.psu.edu/viewdoc/download?doi=10.1.1.70.2035&rep=rep1&type=pdf.
"Hadoop Wiki:" Nov. 23, 2011. Available at: http://goo.gl/Bbfu.
"Amazon Elastic MapReduce," Dec. 2, 2011. Available at: http://aws.amazon.com/elasticmapreduce/.
Thusoo et al., "Data Warehousing and Analytics Infrastructure at Facebook," in SIGMOD, 2010. Published on: Jun. 2010 Available at: http://borthakur.com/ftp/sigmodwarehouse2010.pdf.
Chaiken et al., "SCOPE: easy and efficient parallel processing of massive data sets," in Proc. of VLDB, 2008. Published on: Aug. 2008 Available at: http://pages.cs.brandeis.edu/~olga/cs228/Reading%20List_files/scope.pdf.
"Amazon Cluster Compute," Jan. 2011 Available at: http://aws.amazon.com/ec2/hpc-applications.
Wang et al., "A Simulation Approach to Evaluating Design Decisions in MapReduce Setups," in MASCOTS, 2009. Published on: Sep. 2009 Available at: http://people.cs.vt.edu/butta/docs/mascots09-mrperf.pdf.
"Mumak: Map-Reduce Simulator," Nov. 26, 2011. Available at: http://bit.ly/MoOax.
Dean et al., "MapReduce: Simplified Data Processing on Large Clusters," in Proc. of OSDI, 2004. Published on: Dec. 2004 Available at: http://www.cs.odu.edu/~mukka/cs775s11/Lectures/Hadooptalks/mapreduce-osdi04%5B1%5D.pdf.
Isard et al., "Dryad: Distributed Data-Parallel Programs from Sequential Building Blocks," in Proc. of EuroSys, 2007. Published on: Mar. 2007 Available at: http://www.cse.buffalo.edu/~stevko/courses/cse704/fall10/papers/eurosys07.pdf.
"Apache Hadoop," Aug. 13, 2011. Available at: http://hadoop.apache.org/
Isard at al., "Quincy: Fair Scheduling for Distributed Computing Clusters," in SOSP, 2009. Published on: Oct. 2009 Available at: http://www-users.cselabs.umn.edu/classes/Fall-2010/csci8980-cloud/papers/quincy.pdf.
Zaharia et al., "Delay Scheduling: a Simple Technique for Achieving Locality and Fairness in Cluster Scheduling," in EuroSys, 2010. Published on: Apr. 2010 Available at: http://www.research.yahoo.net/files/eurosys_delay_scheduling.pdf.
White, Hadoop: The Definitive Guide. O'Reilly, 2009. Published on: Jun. 2009 Available at: http://net.pku.edu.cn/~course/cs402/2011/book/2009-Book-Hadoop%20the%20Definitive%20Guide.pdf.
Ananthanarayanan et al., "Reining in the Outliers in Map-Reduce Clusters using Mantri," in OSDI, 2010. Published on: Jun. 2010 Available at: https://netfiles.uiuc.edu/yilu4/www/YLu/Subjects_files/mantri_tr.pdf.

(56) References Cited

OTHER PUBLICATIONS

Krevat et al., "Disks Are Like Snowflakes: No Two Are Alike," in Proc. of the 3th Workshop on Hot Topics in Operating Systems (HotOS), 2011. Published on: May 2011 Available at: http://www.pdl.cmu.edu/PDL-FTP/Storage/HotOS11-Krevat.pdf.

Dean et al., "MapReduce: Simplified Data Processing on Large Clusters," Comm. of ACM, vol. 51, No. 1, 2008. Published on: Jan. 2008 Available at: http://www.ccs.neu.edu/home/lieber/courses/csg113/f08/materials/p107-dean.pdf.

"Tom's Hardware Blog," Dec. 2, 2011. Available at: http://bit.ly/rkjJwX.

Shieh et al., "Sharing the Datacenter Network," in Proc. of USENIX NSDI, 2011. Published on: Apr. 2011 Available at: http://www.usenix.org/events/nsdi11/tech/full_papers/Shieh.pdf.

"Amazon's EC2 Generating 220M," Available at: http://bit.ly/8rZdu.

Greenberg et al., "VL2: a scalable and flexible data center network," in SIGCOMM, 2009. Published on: Aug. 2009 Available at: http://www.cs.uccs.edu/~zbo/teaching/CS522/Projects/SIGCOM09-VL2-DataCenterNetwork.pdf.

Al-Fares et al., "A scalable, commodity data center network architecture," in SIGCOMM, 2008. Published on: Aug. 2008 Available at: http://www.cs.uiuc.edu/homes/caesar/classes/CS598.F08/readings/alfares_datacenters.pdf.

"Traffic Control API," Sep. 7, 2011. Available at: http://bit.ly/nyzcLE.

Li et al., "Webprophet: automating performance prediction for web services," in NSDI, 2010. Published on: Apr. 2010 Available at: http://www.cs.northwestern.edu/~ychen/Papers/nsdi10.pdf.

Li et al., "Cloud-Prophet: Towards Application Performance Prediction in Cloud," in Proc. of ACM SIGCOMM (Poster), 2011. Published on: Aug. 2011 Available at: http://catbert.cs.duke.edu/~xrz/paper/sigcomm_cloudprophet.pdf.

Tertilt et al., "Generic Performance Prediction for ERP and SOA Applications," in Proc. of ECIS, 2011. Published on: Jun. 2011 Available at: http://aisel.aisnet.org/cgi/viewcontent.cgi?article=1196&context=ecis2011.

Joukov et al., "Operating system profiling via latency analysis," in OSDI, 2006. Published on: Nov. 2006 Available at: http://static.usenix.org/event/osdi06/tech/full_papers/joukov/joukov.pdf.

Cantrill et al., "Dynamic Instrumentation of Production Systems", in USENIX ATC, 2004. Published on: Jun. 2004 Available at: http://static.usenix.org/event/usenix04/tech/general/full_papers/cantrill/cantrill.pdf.

Kremer et al., "A Survey of Query Optimization in Parallel Databases", York University Tech. Rep 1999. Published on: Nov. 1999 Available at: http://www.cse.yorku.ca/techreports/1999/CS-1999-04.pdf.

Devanur et al., "Near optimal online algorithms and fast approximation algorithms for resource allocation problems." ACM Conference on Electronic Commerce 2011: 29-38. Published on: Jun. 2011 Available at: http://pages.cs.wisc.edu/~balu2901/papers/2011/online_stochastic.pdf.

Kamath et al., "Routing and admission control in general topology networks with poisson arrivals" in ACM-SIAM SODA 1996. Published on: Jan. 1996 Available at: ftp://reports.stanford.edu/pub/cstr/reports/cs/tr/96/1575/CS-TR-96-1575.pdf.

Lee et al., "Validating Heuristics for Virtual Machines Consolidation", No. MSR-TR-2011-9, Published on: Jan. 2011 Available at: http://research.microsoft.com/pubs/144571/virtualization.pdf.

\* cited by examiner

PREDICTING DATACENTER PERFORMANCE TO IMPROVE PROVISIONING

BACKGROUND

One of the benefits which is often cited for cloud computing is that it provides the users (who are referred to as tenants) with flexible (or elastic) access to resources. The user asks the cloud provider for the resources they require, in terms of the number of compute instances, and they are then charged on the basis of how many compute instances they requested and the length of time over which they were used. This, however, places a burden on the user as they must determine the number of compute instances they require and can result in inefficiencies where a user requests more resources than are actually needed to complete their job. The situation is complicated further where there are shared resources within the datacenter (e.g. the internal network or cloud storage) as the activities of other users can cause the performance experienced by a user to vary significantly. As a result a user's prediction may under-estimate the resources required by a significant margin or a user may over provision (i.e. request more resources than they think they will actually need) just in case.

The embodiments described below are not limited to implementations which solve any or all of the disadvantages of known methods of operating and managing datacenters.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of predicting datacenter performance to improve provisioning are described. In an embodiment, a resource manager element receives a request from a tenant which describes an application that the tenant wants executed by a multi-resource, multi-tenant datacenter. The request that has been received is mapped to a set of different candidate resource combinations within the datacenter, where each candidate resource combination can be used to execute the application in a manner which satisfies a high level constraint specified within the request. This mapping may, for example, be performed using a combination of benchmarking and an analytical model. In some examples, each resource combination may comprise a number of virtual machines and a bandwidth between those machines. Data relating to at least a subset (and in some examples, two or more) of the candidate resource combinations is then presented to the tenant.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
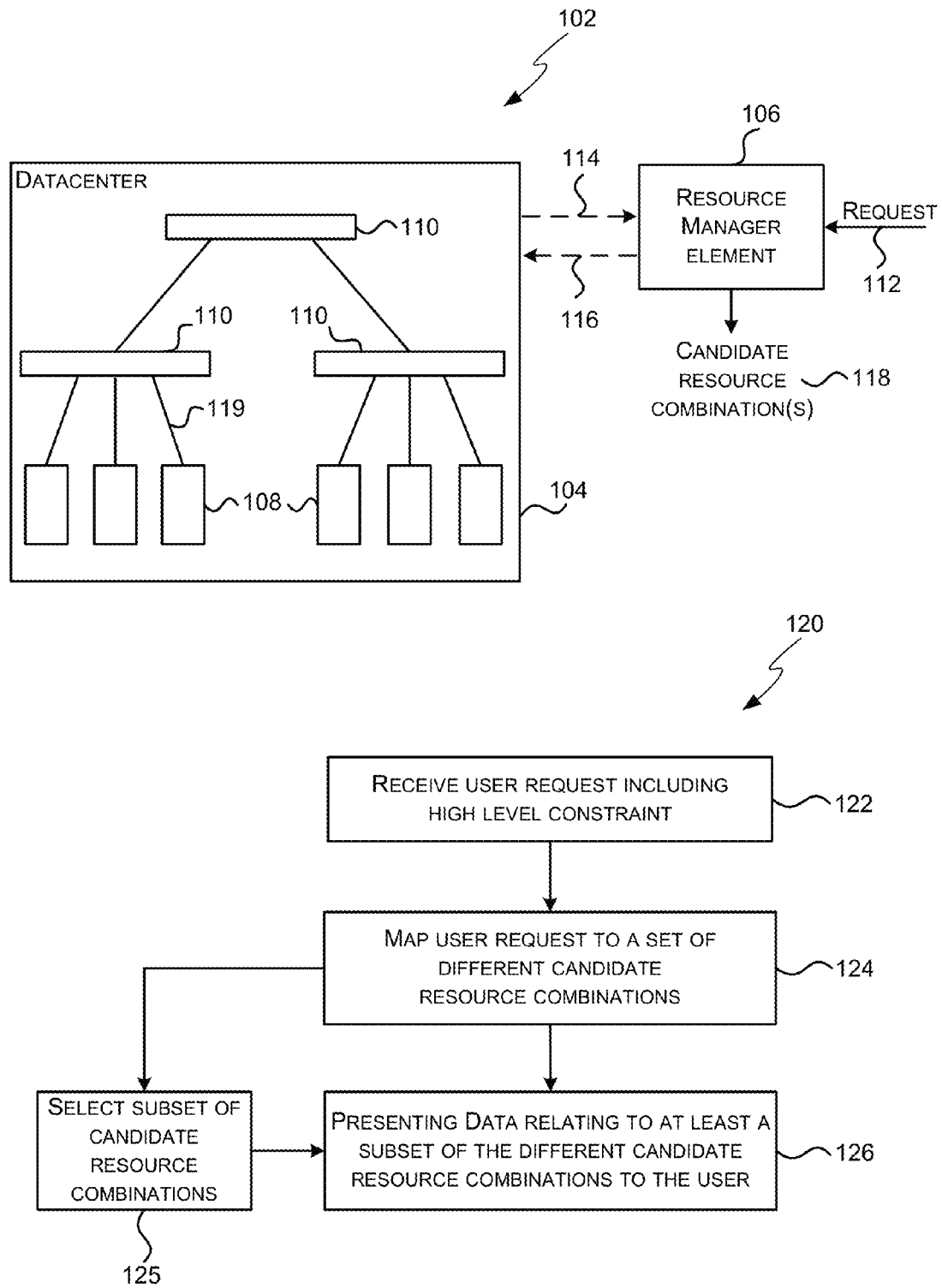
FIG. 1 shows a schematic diagram of a system which comprises a datacenter and a resource manager element and a flow diagram of an example method of operation of the resource manager element.

FIG. 1 shows a schematic diagram of a system 102 which comprises a multi-resource, multi-tenant datacenter 104 and a resource manager element 106. The datacenter 104 comprises machines 108 which are typically connected together by switches 110 in a hierarchy of components (e.g. the datacenter may be made up of pods, with each pod comprising a few racks and each rack comprising machines). Each machine has one or more slots for virtual machines (VMs) which can be allocated to a tenant in response to a tenant (or user) request 112 for resources to run an application. These VMs may be referred to as compute instances. The multi-resource, multi-tenant datacenter 104 may, in some examples, be a cloud-based datacenter, although the methods described herein are also applicable to private or non-cloud-based datacenters. The application which a tenant wishes to run on the datacenter may, for example, be a data analytics job, a three-tier web application or a High Performance Computing (HPC) or scientific application. Where the application is a data analytics job, this may, for example, be a MapReduce job (e.g. Hadoop MapReduce) or may use other data-parallel frameworks such as Dryad or Scope. In other examples, the data analytics job may involve streaming data or may be any other job in which data is processed in a deterministic manner. In cloud-based examples, the application may be referred to as a 'cloud application'. Any reference to a data analytics job in the following description is by way of example only, and the methods described below are applicable to many other types of applications, including, but not limited to, the examples given above.

FIG. 1 also shows a flow diagram 120 of an example method of operation of the resource manager element 106. The resource manager element 106 receives a user (or tenant) request 112 which includes details of the application (such as a data analytics job) to be run and at least one high level constraint (block 122). This high level constraint (which may also be referred to as a 'user requirement') is a user-focused constraint in that it is defined in terms which are centered around the user experience, rather than in terms of any provider-focused or resource-focused aspects such as number of VMs or bandwidth. Examples of such high level constraints include, but are not limited to, a performance-oriented constraint (e.g. defined in terms of a completion time required, such as completion of the application within X hours, or data throughput, such as a required minimum throughput of X Mbit/s), a cost-oriented constraint (e.g. completion of the application must not cost more than $X or must cost between $X and $Y) or a combination of a performance-oriented constraint and a cost-oriented constraint (e.g. completion of the application within X hours and costing no more than $Y). Another example of a high level constraint which is a combination of performance and cost would be to perform the application for the minimum value of a parameter which comprises cost multiplied by completion-time.

The details of the application to be run which are included within the user request 112 (along with at least one high level constraint) may comprise one or both of the following: the job or program to be run and the amount of data which is to be processed by the application (which may be referred to as the 'input data size'). In some examples, the details of the application may further comprise a representative sample of the input data.

The resource manager element 106 maps the tenant request which is received (in block 122) to a set of candidate resource combinations (block 124). Each element in the set of candidate resource combinations comprises a different combination of datacenter resources which satisfy the high level constraint(s) within the user request. A candidate resource combination may be defined in terms of one of many different combinations of resources and in an example, the resources may include two or more of: the number of VMs that would be allocated to the user, the network bandwidth between VMs which would be reserved for the user, the bandwidth to the storage service which would be reserved for the user, the types of VMs, memory and time (where this time may, for example, relate to the time taken to run the application, the start time of the application and/or the delay before the start of the application). Within a set of candidate resource combination, each candidate resource combination is defined in terms of the same set of resources (e.g. each combination defines a number of VMs, N, and a network bandwidth between those VMs, B, such that the set is: $<N_1,B_1>, <N_2,B_2>, \ldots, <N_n,B_n>$ where n is an integer).

There are many ways in which the mapping from user request to a resource combination may be performed and this process may be referred to as 'application profiling' or 'job profiling', where the term 'job' in this context relates to the running of an application, which may in some examples be a data analytics job but is not limited to such examples and applies to any type of application. Profiling a job may, for example, be achieved by (i) a-priori analytical models that describe how a job's performance scales with different resources, (ii) job benchmarking where a job is run on a subset of the input data and a projection of its performance is estimated, (iii) static analysis of the job code or (iv) using statistics collected from previous runs of the same or similar jobs. In other examples, the job may be profiled using a combination of two or more of these techniques (e.g. using a combination of a-priori analytical models and benchmarking). In other examples, any method of job profiling may be used which is able to generate the set of candidate resource combinations in a reasonable amount of time (e.g. in a matter of seconds or minutes but not hours).

In many examples, the job profiling process (in block 124) may use information on the current state of the datacenter (e.g. as provided by the datacenter 104 to the resource element manager 106 via arrow 114), such as the current resource utilization within the datacenter. This datacenter state information enables the job profiler to more accurately predict performance, which improves the accuracy of the candidate resource combinations which are identified, i.e. the resource manager element 106 is less likely to generate a candidate resource combination which although it would satisfy a performance-oriented constraint in theory, cannot in reality satisfy that constraint given the current status of the datacenter.

Having generated the set of candidate resource combinations (in block 124), the resource manager element 106 presents data relating to at least a subset of these candidate resource combinations 118 to the user who issued the initial request 112 (block 126). The subset may comprise the entire set of candidate resource combinations, two or more candidate resource combinations selected from the set or a single candidate resource combination selected from the set. As shown in FIG. 1, this may involve selection of some of the candidates from the set of candidate resource combinations (in block 125) or there may be no selection (block 125 omitted) in which case the entire set of candidate resource combinations is presented to the user. Where selection (in block 125) is used (to identify the subset) any suitable selection technique may be used, including random (or pseudo-random) selection or selection based on a metric and examples of the selection process which may be used are described in more detail below.

The data relating to at least a subset of the candidate resource combinations, which is presented to the user (in block 126) may, for example, comprise the cost (or estimated cost) of the application using each resource combination, the time that it will take to complete the application using each resource allocation and the data throughput of the application using each resource allocation. In some examples, the candidate resource combinations themselves may be presented to the user in addition to, or instead of any other data (e.g. in addition to or instead of completion time/cost data). Where costs are provided, these costs may be based on the standard pricing model (e.g. number of VMs and length of time used) or another pricing model (e.g. an application-based pricing model), such as those described in more detail below.

Where data relating to a single candidate resource combination is presented to the user (in block 126), the candidate resource combination information may be passed automatically to the datacenter (e.g. as indicated by arrow 116) so that the appropriate resources may be provisioned automatically within the datacenter (i.e. allocated to the tenant) without requiring any user input. In other examples, irrespective of the number of candidate resource combinations for which related data is presented to a user, the user may choose (or select) one of the options (and hence candidate resource combinations) presented to them before the resources are allocated to the user in the datacenter (e.g. the user may be required to select one from one or one from many) and in such an example, the message identifying the selected resource combination may be passed from the client device used by the tenant to the datacenter 104 by any route and in some cases may be passed via the resource manager element 106. The data relating to each candidate resource combination which is presented to the user (in block 126) may assist the using in making their choice.

The resource manager element 106 may be located within the datacenter 104, external to the datacenter 104, local to the user (or tenant) or anywhere else with connectivity (e.g. appropriate interfaces) to the datacenter 104 (as indicated by dotted arrows 114, 116). Similarly, the resource manager element 106 may be operated by the datacenter provider, the user or by a third party (e.g. on behalf of the datacenter provider or in the form of a service offered to the datacenter provider). Although bi-directional communication is shown in FIG. 1 between the resource manager element 106 and the datacenter 104, in other examples there may be unidirectional communication from/to the datacenter 104.

Figure 2:
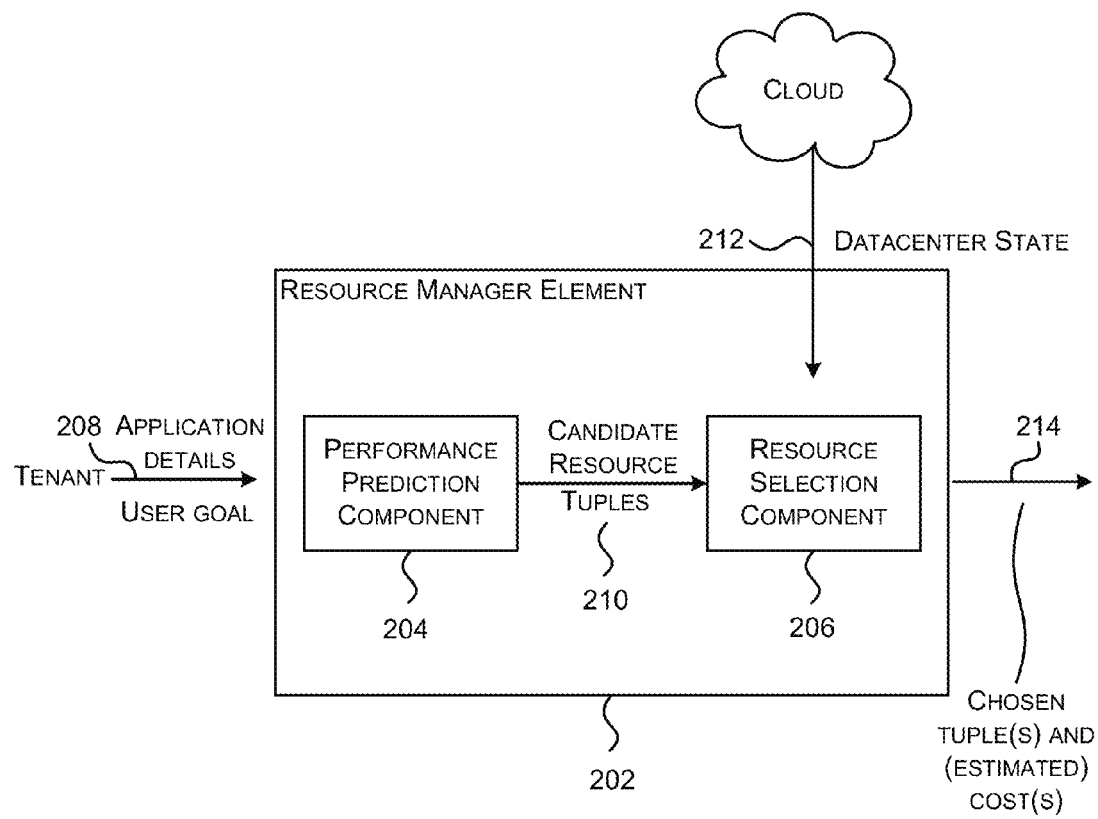
FIGS. 2 and 5 show schematic diagrams of further example resource manager elements which may be used in the system shown in FIG. 1.

FIG. 2 shows a schematic diagram of another example resource manager element 202 which may be used in the system 102 of FIG. 1 (instead of resource manager element 106) in implementations where the resource manager element performs selection of candidate resources (in optional block 125). In this example, the resource manager element 202 comprises a performance prediction component 204 and a resource selection component 206. As described above with reference to FIG. 1, the resource manager element 202 receives a request 208 from a tenant which includes application details and a high level constraint (which may also be referred to as a 'user goal'). The performance prediction component 204 performs the application profiling and generates a set of candidate resource combinations which may also be referred to as candidate resource tuples 210, e.g. $<N_1,B_1>, <N_2,B_2>, \ldots, <N_n,B_n>$ where N is the number of VMs, B is the network bandwidth between VMs and n is an integer. The resource selection component 206 takes this set of candidate resource tuples as an input and using a metric or other criteria (which may, for example, be random selection) selects a subset of the candidate resource tuples and in an extreme case selects a single candidate resource tuple. As described above, this selection may use datacenter state information 212 received by the resource manager element 202. As also described above, data relating to the selected subset 214 (such as estimated cost) is then presented to the tenant.

In various examples, the resource selection component 206 selects which resource tuple (i.e. which single candidate resource combination) is allocated to the tenant for the particular job detailed in the tenant request. Since all of the candidate resource combinations satisfy the user-specified high level constraint, the provider may have the flexibility regarding which candidate resource combination to allocate. In such an example, the candidate resource combination may be selected which is optimum for the provider, for example, the candidate resource combination may be selected to optimize a datacenter provider's goal, such as minimizing the impact of the request on the datacenter provider's ability to accommodate subsequent tenant requests. In such a selection process, different candidate resource combinations are compared in terms of their suitability from the provider's perspective taking into consideration that the suitability of a given resource combination depends not only on the quantity of individual resources requested, but also on the current state of the datacenter and in some examples on the future expected state of the datacenter. Performing this comparison of suitability for a provider is a non-trivial problem.

Figure 3:
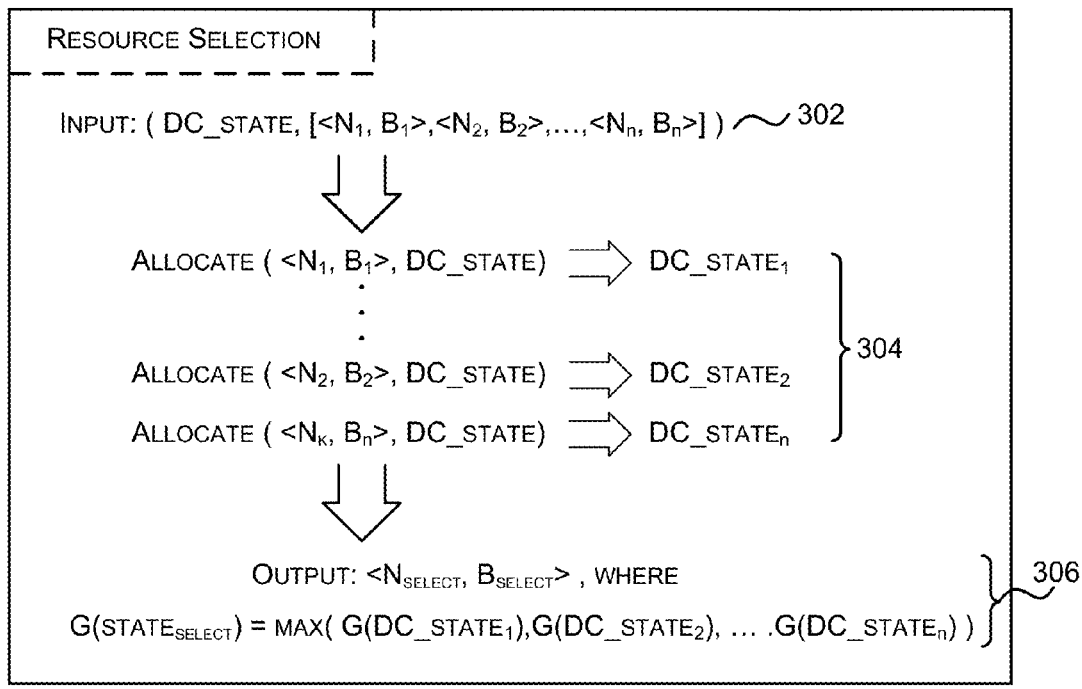
FIG. 3 is a flow diagram of an example method of comparing candidate resource combinations.

FIG. 3 shows an example method of comparing candidate resource combinations (which in this example are resource tuples <N,B>) in which the problem of comparing resource tuples is transformed to comparing datacenter states that result from the allocation of the corresponding resources. Here, the state of a datacenter characterizes the resources left unallocated in the datacenter. As shown in FIG. 3, the input 302 received by the resource selection component 206 comprises the current datacenter state DC-state and the set of candidate resource tuples $<N_1,B_1>, <N_2,B_2>, \ldots, <N_n,B_n>$. Using the provider allocation protocol "Allocate", the datacenter states DC_State$_1$, DC_State$_2$, ..., DC_State$_n$ which would result from allocation of each of the candidate resource tuples independently are then determined (block 304).

A goodness value or metric (G) that captures how suitable the datacenter is for accepting subsequent requests is then used to make the comparison. A goodness value is computed for each of the resultant states DC_State$_1$, DC_State$_2$, ..., DC_State$_n$ and the resource tuple yielding the state with the highest goodness value is selected as the one to be used for the tenant's request (block 306). As shown in FIG. 3, of the n candidate tuples, $<N_{select}, B_{select}>$ is the most suitable for the provider, where this tuple is determined by:

$$G(\text{state}_{select}) = \max(G(\text{DC\_State}_1), G(\text{DC\_State}_2), \ldots G(\text{DC\_State}_n)).$$

There are many example ways in which the goodness value G may be computed and an example is described in detail below by way of example.

In this example, the state of a datacenter is given by the unallocated fraction of each datacenter resource. In a general multi-resource setting with n resources, the datacenter state is $[f_1, \ldots, f_n]$, where $f_i$ is the unallocated fraction of resource i. The more the unallocated resources, the more able the provider is positioned to accept new tenants. Hence, a state's goodness may be a considered to be a function of the resources left. Using this, a metric may be defined that minimizes the imbalance in the utilization across all resources to determine a goodness value of a particular state.

While the ideas described herein apply to general multi-resource settings, in the example described below two resources are used by way of example: compute instances (i.e. number of VMs) and network bandwidth. In such an example, the datacenter state consists of the VM slots unallocated on physical machines (e.g. machines 108 in the system 102 shown in FIG. 1) and the unallocated bandwidth on individual network links (e.g. links 119 in the system 102 shown in FIG. 1). The resource imbalance on a single physical machine may be computed as follows: consider a machine with $N^{max}$ VM slots of which $N^{left}$ are unallocated. Further, the outbound link of the machine has a capacity $B^{max}$ of which $B^{left}$ is unallocated. The fractional residual VM slots and bandwidth for the machine is given by $N^{left}/N^{max}$ and $B^{left}/B^{max}$ respectively. The resource imbalance on the machine can thus be characterized by:

$$\left\{\frac{N^{left}}{N^{max}}\right\}^2 + \left\{\frac{B^{left}}{B^{max}}\right\}^2$$

Since the square of the fractional resources are summed, a lower value indicates that the residual resources are more balanced than a higher value.

The hierarchical nature of typical datacenter topologies implies that the datacenter consists of a hierarchy of components, as described above. To capture the resource imbalance at each level of the datacenter, the overall resource imbalance may be defined as the sum of the imbalance at individual components. Specifically, for a datacenter state, the Resource Imbalance is given by:

$$\sum_{c \in C} \left\{ \frac{N_c^{left}}{N_c^{max}} \right\}^2 + \left\{ \frac{B_c^{left}}{B_c^{max}} \right\}^2$$

where C is the set of components in the datacenter (i.e. machines, racks, pods) with any resource allocated, $N_c^{left}$ and $N_c^{max}$ are respectively the number of unallocated and total VM slots in the component c, and $B_c^{left}$ and $B_c^{max}$ are the residual and total bandwidth of links connecting the component to the rest of the datacenter. Since a lower resource imbalance indicates a more favorably positioned provider, the goodness value of the state is the inverse of resource imbalance. An example of the use of this Goodness metric can be described with reference to FIG. 4.

Figure 4:
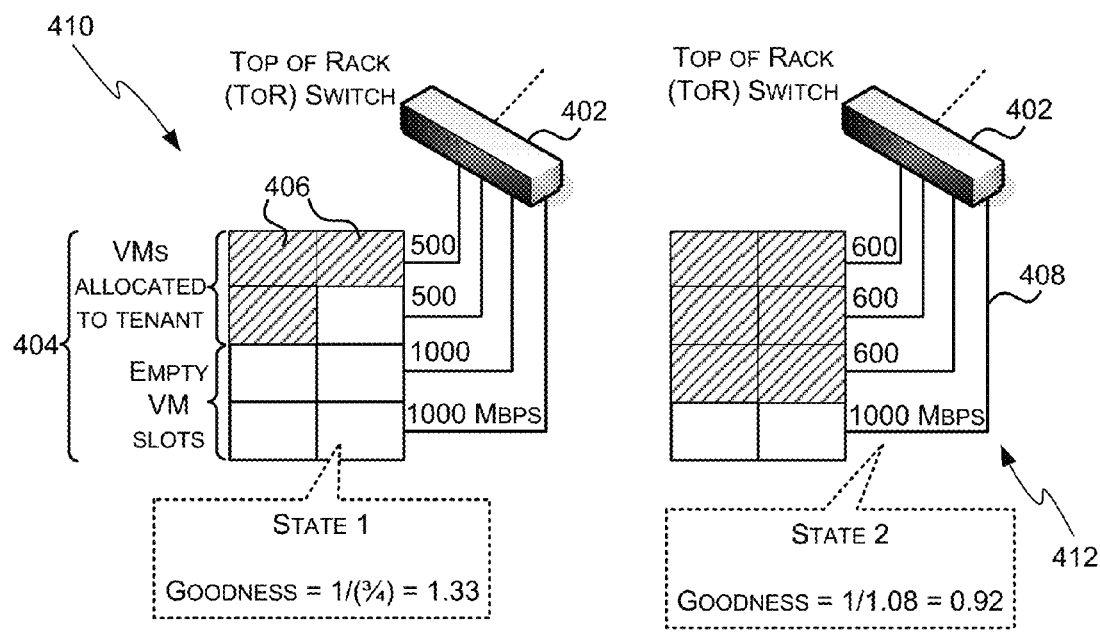
FIG. 4 is a schematic diagram of a part of a datacenter.

FIG. 4 shows a schematic diagram of a rack 402 of physical machines 404 in a datacenter with 2 VM slots 406 and a Gigabit link 408 per machine (i.e. each machine has an outbound link of capacity 1000 Mbps). Given a tenant request with two candidate tuples <N,B>, where B is in Mbps: <3,500> and <6,200>, there are two states which would result from allocating these candidate resource combinations and these are shown in FIG. 4. The allocated VMs are shown shaded in FIG. 4, whilst empty VM slots are left unfilled and each link 408 in FIG. 4 is annotated with its residual bandwidth (following the allocation process).

It can be seen that after the allocation of the <3,500> tuple, as shown in state 1, 410, the provider is left with five empty VM slots, each with an average network bandwidth of 500 Mbps. As a contrast, the allocation of the <6,200> tuple results in two empty VM slots, again with an average network bandwidth of 500 Mbps (state 2, 412). Any subsequent tenant request that can be accommodated by the provider in state 2 can also be accommodated in state 1; however, the reverse is not true. For instance, a future tenant requiring the tuple <3,400> can be allocated in state 1 but not state 2. Hence, state 1 is more desirable for the provider and this is reflected in the goodness metric as described below.

In state 1, the allocation involves two physical machines and so the resource imbalance is given by:

on machine 1=$(0)^2$ slots+$(500/1000)^2$ Mbps on machine 2=$(½)^2$ slots+$(500/1000)^2$ Mbps Total resource imbalance=¼+½=¾

Goodness=1/(¾)=1.33

As this calculation shows, physical machines which are not involved in the allocation are ignored when computing resource imbalance and hence the Goodness metric.

In state 2, the allocation involves three machines and the imbalance on each of machine 1, 2 and 3 is given by:

$(0)^2$ slots+$(600/1000)^2$ Mbps

Total resource imbalance=3*$(600/1000)^2$=1.08

Goodness=1/1.08=0.92

This Goodness metric is lower than the value for state 1 and consequently, the first candidate tuple, <3,500>, which has the higher goodness value (Goodness=1.33) would be chosen by the resource selection component 206 in FIG. 2.

It should be noted that although this example only considers resource imbalance at a machine level, in reality, the metric described above would be evaluated over the entire set of components, C, in the datacenter (i.e. machines, racks, pods) and so in more complex examples, the summation would consider multiple levels within the datacenter. Again, components of the datacenter which are not involved in the allocation are ignored when computing resource imbalance and hence Goodness metric.

The example metric described above minimizes the imbalance in the utilization across all resources to determine a goodness value of a particular state and is appropriate where a provider is agnostic to the distribution of future requests. Another example metric, however, may aim at minimizing the utilization of one particular resource versus another. In other examples, a different metric may be used.

It will be appreciated that the example metric is described above with reference to a resource tuple <N,B> by way of example only and alternative candidate resource combinations may alternatively be used, e.g. <N,B,t> where t is a time parameter (e.g. time taken, start time, delay before start, etc).

Figure 5:
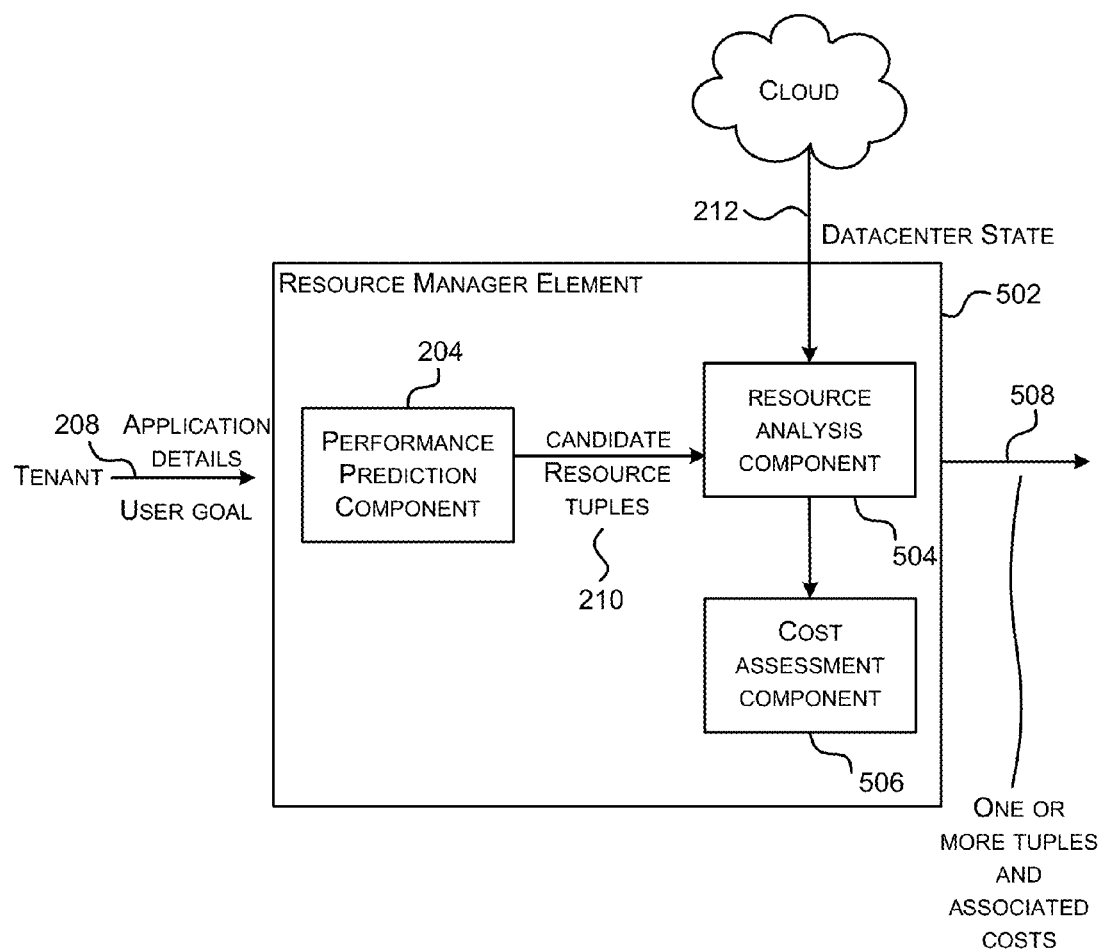

FIG. 5 shows a schematic diagram of another example resource manager element 502 which may be used in the system 102 of FIG. 1 (e.g. instead of resource manager element 106) irrespective of whether the resource manager element performs selection of candidate resources (in optional block 125) or not (optional block 125 omitted). In this example, the resource manager element 502 comprises a performance prediction component 204, a resource analysis component 504 and a cost assessment component 506. As described in more detail below, the resource analysis component 504 may be the same as the resource selection component 206 in FIG. 2 (and described above) or the component may be different.

Figure 6:
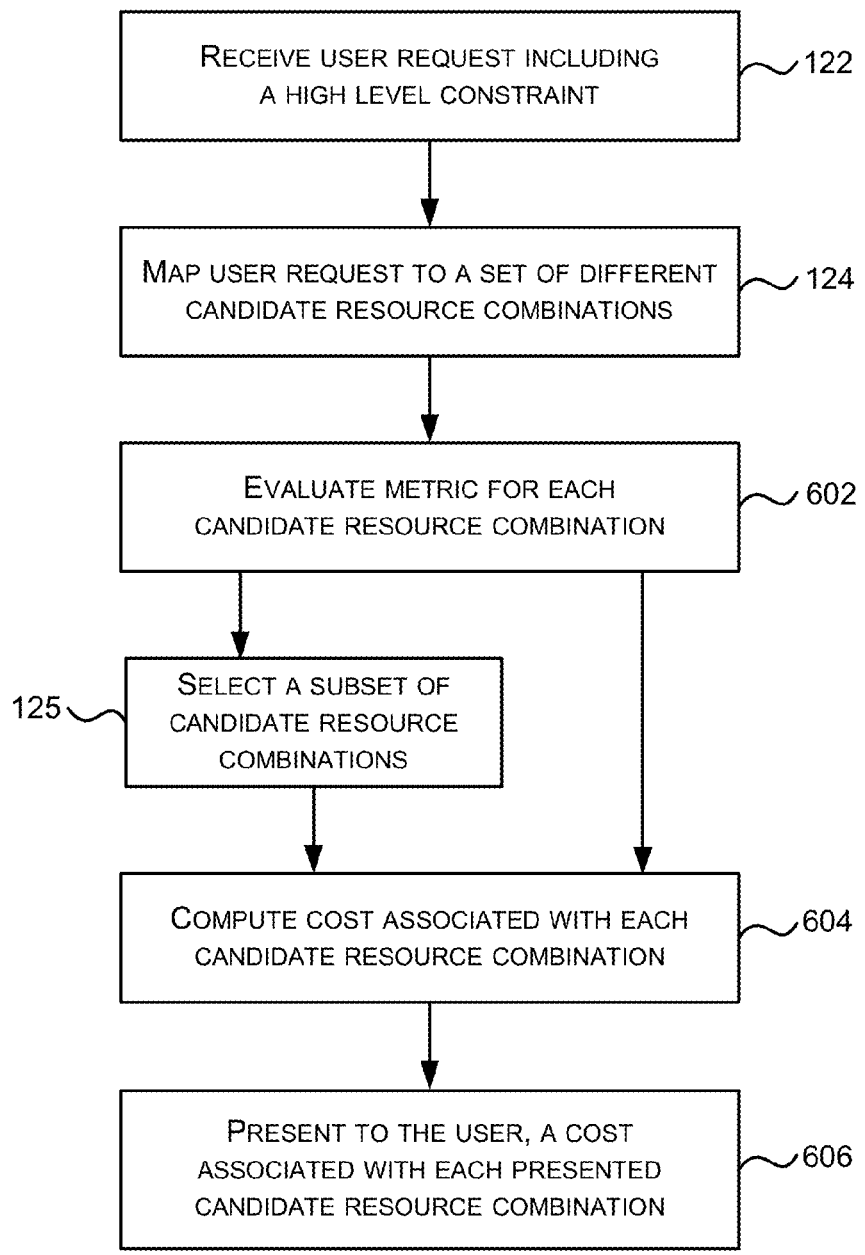
FIG. 6 is a flow diagram of an example method of operation of the resource manager element shown in FIG. 5.

The operation of this resource manager element 502 can be described with reference to the example flow diagram shown in FIG. 6. As described above with reference to FIGS. 1 and 2, the resource manager element 502 receives a request 208 from a tenant which includes application details and a high level constraint (block 122). The performance prediction component 204 performs the job profiling (block 124) and generates a set of candidate resource tuples 210. The resource analysis component 504 then evaluates a metric for each candidate resource combination (block 602), for example as described above. Following this evaluation, the resource analysis component 504 may use the evaluated metrics or other criteria (which may, for example, be random selection) to select a subset of the candidate resource tuples (block 125) and in an extreme case selects a single candidate resource tuple. Where selection is performed, the resource analysis component 504 may be the same as the resource selection component 206 shown in FIG. 2 and described above. In other examples, the resource analysis component 504 does not perform any selection (block 125 omitted).

Irrespective of whether selection is performed or not, the cost analysis component 506 computes a cost associated with each candidate resource combination which is to be presented to the user (block 604), i.e. where selection has been performed (in block 125), this cost analysis is performed (in block 604) only for those candidate resource combinations which were selected (in block 125) and where selection is not performed (block 125 is omitted), the cost analysis is performed (in block 604) on all the candidate resource combinations in the set (as determined in block 124). The resource manager element 502 then presents the computed costs for at least a subset of the different candidate resource combinations to the user (block 606), i.e. computed costs for each of the selected candidate resource combinations will be presented (or displayed) where selection has occurred (in block 125) and computed costs for every candidate resource combination (as identified in block 124) will be presented where selection has not occurred (block 125 is omitted). In addition to presenting the computed cost associated with the different candidate resource combinations (in block 606), additional data relating to each presented candidate resource combination may also be displayed (e.g. completion time or details of the candidate resource combination itself).

The cost which is computed for a particular candidate resource combination (in block 604, by the cost assessment component 506) may use a standard costing model which may be termed a 'resource-based' pricing model e.g. based on the number of VMs and the expected time to complete the application. A different resource-based pricing model may be based on the particular resource elements within the candidate resource tuple, for example N and B. In such an example, a tenant may pay $NT(k_v+k_bB)$ where T is the time that the resources are occupied for and $k_v$, $k_b$ are the corresponding prices. In these resource-based pricing models, the cost which is computed by the cost assessment component 506, is in many examples, only an estimated cost and the tenant may actually pay a slightly different price for the application dependent upon whether it is completed in the time expected or whether it overruns (e.g. due to congestion of shared resources within the datacenter).

In other examples, however, the computed cost (as computed in block 604, by the cost assessment component 506) may be based on the metric which is computed for the particular candidate resource combination (where the metric is computed in block 602). For example, the computed cost may be based on the Goodness metric for the resultant state (described above) such that candidate resource combinations with higher Goodness values are priced more favorably (e.g. given a lower price) than those candidate resource combinations with lower Goodness values. This provides flexibility to the user whilst encouraging them to select an option which is preferable to the provider and therefore benefits both parties. If, however, a user wishes to select a candidate resource combination which leaves the datacenter in a less preferable state, the provider is compensated for this financially. In such examples, the cost may be the actual price of the job that the user will pay rather than a cost estimate.

In examples where the computed cost is not dependent directly upon the particular resources in the candidate resource combination but instead is dependent upon the Goodness metric or other metric used to assess how optimum the candidate resource combination is to the provider (compared to other candidate resource combinations in the set), the costing may be referred to as 'non-resource based pricing', 'application-based pricing' or 'job-based pricing' (where again, the term 'job' in this context is not limited to data analytics jobs but relates to the running of any application) to distinguish it from the standard costing model which is based on the resources allocated to a tenant. In such instances, the costs which are computed may be dynamic and a function of the current state of the datacenter (e.g. users may pay more when the datacenter is busy and less at times of lower demand).

Job-based pricing, as described above, provides an incentive for providers to complete tenant jobs on time (or earlier). Using standard resource-based cost models, the actual price paid by a tenant for a job depends on the resources used (e.g. the number of VMs) and the length of time for which they are used. If a job takes longer than expected (e.g. longer than the user's desired completion time), this inflates the tenant cost and if a job is completed more quickly, the tenant pays less. As a result there is no incentive to the provider to reduce completion time. However, by decoupling tenants from underlying resources and moving to job-based pricing, tenants specify what they desire in terms of the high level constraint and are charged accordingly. Providers can, in some implementations (e.g. where selection is performed by the resource manager element) decide how to efficiently accommodate the tenant request based on application characteristics and current datacenter utilization and this may result in a reduced completion time for the tenant (e.g. the provider may choose to over-provision and allocate additional resources above the selected candidate resource combination in order that the job is completed more quickly).

The use of job-based pricing in combination with provider driven selection of a candidate resource tuple which satisfies the tenants specified goal (as specified in the high level constraint) can result in a symbiotic tenant-provider relationship where tenants benefit due to fixed costs upfront and better-than-desired performance while providers use the increased flexibility to improve goodput and consequently, revenue. This symbiotic relationship also exists where a user is presented with a job-based costs associated with multiple resource combinations—if a user selects a non-preferred combination (from the provider perspective), they pay more and this may compensate the provider financially for the fact that the datacenter is now in a less optimum or less efficient state which may result in an increase in the number of subsequent jobs which are refused because they cannot be accommodated within the datacenter.

As described above, the mapping or job profiling which is performed by the resource manager element 106, 202, 502 (e.g. by the performance prediction component 204 within the resource manager element 202, 502) may be done in many different ways and examples include (i) a-priori analytical models that describe how an application's performance scales with different resources, (ii) application benchmarking where an application is run on a subset of the input data and a projection of its performance is estimated, (iii) static analysis of the application code or (iv) using statistics collected from previous runs of the same or similar applications, or any combination thereof. To allow for an exploration of different resource combinations, a fast yet reasonably accurate prediction of the completion time of an application executing on a specific set of resources needs to be made (e.g. in a matter of seconds or minutes rather than hours).

An example method of job profiling can be described with reference to FIG. 7 and is referred to herein as the MapReduce Completion Time Estimator (MRCTE). This method which is described by way of example, uses a gray-box approach to performance prediction complementing an analytical model with application benchmarking. This particular example uses a Hadoop MapReduce job, but the methods described could be extended to other applications using the same techniques as described below, where such other applications include, but are not limited to jobs in other data analytics frameworks like Dryad, Scope, other flavors of MapReduce and other data analytics jobs.

Figure 7:
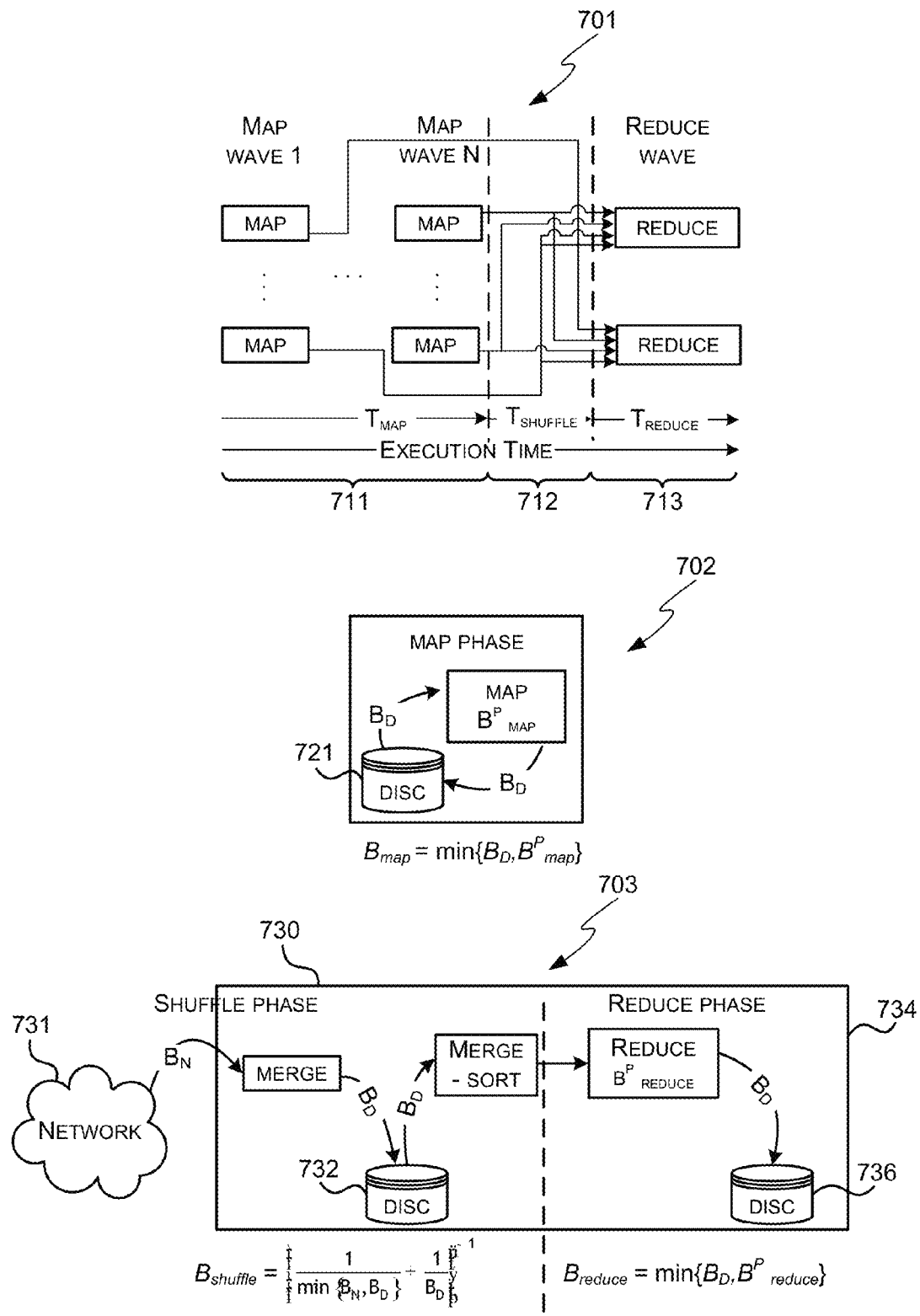
FIG. 7 is a flow diagram of an example method of job profiling.

FIG. 7 shows schematic diagrams of the resources involved at each phase of a MapReduce job. These diagrams are a high-level model of the operation of MapReduce jobs from which an analytical expression for a job's completion time (white-box analysis) can be constructed as is shown below. The resulting expression consists of job-specific and infrastructure-specific parameters like the disk I/O bandwidth. These parameters are determined by profiling the tenant job with a sample dataset on the provider's infrastructure (black-box analysis). The white-box analysis relies on knowledge of the MapReduce process and the black-box analysis uses sample data running on a sample machine and the exact process which is involved in executing the job on the sample dataset is not (or does not need to be) known.

The analytical expression is derived as follows: given the program P for a MapReduce job, size of the input data |I|, a sample of the input data $I_s$, and a resource tuple <N,B>, MRCTE estimates the job completion time $T_{estimate}$, i.e.

$$MRCTE(P,|I|,I_s,N,B) \to T_{estimate}$$

Each MapReduce job contains several tasks and comprises three phases, as shown in the first diagram 701 in FIG. 7. The first phase 711 is the map phase, where map tasks read input data and apply a map function to generate an intermediate list of key-value pairs. The second phase 712 is the shuffle phase, involving a data shuffle across the network so that each reduce task gets a partition of the intermediate data produced by the map phase, and the third phase 713 is the reduce phase, where a reduce function is applied to generate output. All tasks in a phase may not run simultaneously, instead, the tasks may execute in waves. For instance, diagram 701 of FIG. 7 consists of N map waves. Typically, the three different phases shown in diagram 701 execute sequentially which implies that the completion time for a job is the sum of the time to complete individual phases, i.e.:

$$T_{estimate} = T_{map} + T_{shuffle} + T_{reduce}$$

To determine the completion time of individual phases, the rate at which a given phase processes data is estimated and this is referred to as the 'phase bandwidth'. Since each phase uses multiple resources (CPU, disk, network), the slowest or the bottleneck resource governs the phase bandwidth. Bottleneck analysis is therefore used to determine the bandwidth for individual phases. Overall, the completion time for each phase depends on the number of waves in the phase, the amount of data consumed or generated by each task in the phase and the phase bandwidth.

During the map phase (as shown in diagram 702 in FIG. 7), each map task reads its input off the local disk 721, applies the map function and writes the intermediate data to local disk 721. Thus, a map task involves two resources, the disk 721 and CPU, and the map phase bandwidth is governed by the slower of the two. Hence, $B_{map} = \text{Min}\{B_D, B_{map}^P\}$, where $B_D$ is the disk I/O bandwidth and $B_{map}^P$ is the rate at which data can be processed by the map function of the program P (assuming no other bottlenecks).

During the shuffle phase 730 (as shown in diagram 703 in FIG. 7), reduce tasks complete two operations. Each reduce task first reads its partition of the intermediate data across the network 731 and then merges and writes it to disk 732. The slower of the two resources governs the time for this operation, i.e. bandwidth=Min $\{B_D, B_N\}$, where $B_N$ is the network bandwidth (which corresponds to the value B described above with reference to candidate resource tuples). Next, the data is read off the disk and merge-sorted before being consumed by the reduce phase. This operation is bottlenecked at the disk, i.e. bandwidth=$B_D$. Given that the two operations occur in series, the shuffle phase bandwidth is $$B_{shuffle} = \left\{ \frac{1}{\text{Min}\{B_D, B_N\}} + \frac{1}{B_D} \right\}^{-1}$$

Finally, the reduce phase 734 (as shown in diagram 703 in FIG. 7) involves reducers reading the intermediate data produced by the shuffle, applying the reduce function and writing the output to disk 736. Thus, as with the map phase, the reduce phase involves the CPU and disk and the phase bandwidth is $B_{reduce} = \text{Min}\{B_D, B_{reduce}^P\}$.

For a MapReduce job with M map tasks, R reduce tasks and input of size |I|, each map task consumes |I|/Mbytes, while each reduce task consumes $|I|/(S_{map}*R)$ bytes and generates $|I|/(S_{map}*S_{map}*R)$ bytes. Here, $S_{map}$ and $S_{reduce}$ represent the data selectivity of map and reduce tasks respectively (i.e. the proportion of input data which is output by the particular tasks). These are assumed to be uniform across all tasks.

For a job using NVMs with $M_c$ map slots per-VM, the maximum number of simultaneous mappers is $N*M_c$. Consequently, the map tasks execute in $$\left\lceil \frac{M}{N*M_c} \right\rceil$$

waves. Similarly, the reduce tasks execute in $$\left\lceil \frac{R}{N*R_c} \right\rceil$$

waves, where $R_c$ is the number of reduce slots per-VM.

Given these values, the completion time for a task is determined by the ratio of the size of the task input (e.g. $Input_{map}$ for the map phase) to the task bandwidth (as derived above, e.g. $B_{map}$ for the map phase). Further, since tasks belonging to a phase execute in waves, the completion time for a phase depends on the number of waves (e.g. $Waves_{map}$ for the map phase) and the completion time for the tasks within each wave. For instance, the completion time for the map phase is given by $$T_{map} = Waves_{map} * \frac{Input_{map}}{B_{map}} = \left\lceil \frac{M}{N*M_c} \right\rceil * \left\{ \frac{|I|/M}{B_{map}} \right\}$$

Using similar logic for the shuffle and reduce phase completion time, the estimated job completion time is $$T_{estimate} = T_{map} + T_{shuffle} + T_{reduce} = \left\lceil \frac{M}{N*M_c} \right\rceil * \left\{ \frac{|I|/M}{B_{map}} \right\} + \left\lceil \frac{R}{N*R_c} \right\rceil * \left\{ \frac{|I|/\{S_{map}*R\}}{B_{shuffle}} \right\} + \left\lceil \frac{R}{N*R_c} \right\rceil * \left\{ \frac{|I|/\{S_{map}*S_{reduce}*R\}}{B_{reduce}} \right\}$$

The analytical model described above assumes that the map tasks are scheduled so that their input is available locally and the output generated by reducers is written locally with no further replication. Further, it is assumed that the reduce tasks are separated from the map phase by a barrier and execute once all the map tasks are finished. These assumptions were used for purposes of clarity of explanation; however, the model and the resulting tool do not rely on them. For instance, to account for non data-local maps, the network bandwidth may also be considered when estimating $B_{map}$. In addition it is assumed that the set of keys is evenly distributed across reducers. In case of skewed key distribution, the input is sampled to determine the worst-case reducer load.

The analytical model described above involves two types of parameters: i) the ones that are specific to the MapReduce configuration and are assumed to be known to the provider such as the number of map slots per-VM ($M_c$), and ii) the ones that depend on the infrastructure and the actual tenant job. For the latter, the resource manager element 106, 202, 502 (e.g. the performance prediction component 204 within the resource manager element 202, 502) profiles the corresponding MapReduce program P by executing it on a single machine using a sample of the input data $I_s$. The profiler (which is a component within the resource manager element 106, 202, 502 or performance prediction component 204) determines the execution time for each task and each phase, the amount of data consumed and generated by each task, etc. All this information is gathered from the log files generated during execution, and is used to determine the data selectivity ($S_{map}$, $S_{reduce}$) and bandwidth ($B_{map}$, $B_{reduce}$, $B_D$ whereas $B_{shuffle}$ is not determined for reasons explained below) for each phase. Concretely, $$\text{Profiler}(P, I_s) \rightarrow \{S_{map}, S_{reduce}, B_{map}, B_{reduce}, B_D\}$$

For instance, the ratio of the data consumed by individual map tasks to the map task completion time yields the bandwidth for the job's map phase ($B_{map}$). The reduce phase bandwidth is determined similarly. Since the profiling involves only a single VM with no network transfers, the observed bandwidth for the shuffle phase is not useful for the model. Instead, the disk I/O bandwidth ($B_D$) is measured under MapReduce-like access patterns, and this is used to determine the shuffle phase bandwidth.

The job profiler assumes that the phase bandwidth observed during profiling is representative of actual job operation. Satisfying this assumption poses two challenges: infrastructure heterogeneity and representative sample data. To address infrastructure heterogeneity, the machine used for profiling may be selected on the basis that it offers the same performance as any other machine in the datacenter. However, while physical machines in a datacenter often have the same hardware configuration, their performance can vary, especially disk performance and this may significantly degrade prediction performance (e.g. as a result of underestimating the reduce phase time). To counter this, MRCTE maintains statistics regarding the disk bandwidth of individual machines (e.g. by profiling the machines periodically) and these statistics are used to adjust the results obtained from profiling. Alternatively, these statistics may be directly inserted into the job profiling (e.g. in $B_D$).

As described above, to obtain optimum results, the sample data used for profiling is representative and of sufficient size. If the sample data is too small, intermediate data will not be spilled to disk by the map and reduce tasks, and the observed bandwidth will be different from that seen by the actual job. In order to address this, MapReduce configuration parameters regarding the memory dedicated to each task may be used to determine the minimum size of the sample data. Two example jobs, Sort and WordCount, are popular for MapReduce performance benchmarking and are used in business data processing and text analysis respectively. The two jobs are very different (and may be considered at extreme ends of the spectrum of jobs): Sort is an I/O intensive job while WordCount is processor intensive. These two jobs require 0.5-3 GB of sample data, which is a non-negligible yet small value compared to typical datasets used in data intensive workloads. Jobs with multiple stages need more sample data since data gets aggregated across stages and to ensure enough data for the last stage when profiling, a large sized sample is needed. This overhead could be reduced by profiling individual stages separately but requires detailed knowledge about the input required by each stage.

The profiling time for jobs such as Sort and WordCount is around 100 seconds. For multi-stage jobs (such as Term Frequency-Inverse Document Frequency which is used for information retrieval and LinkGraph which is used for creation of large hyperlink graphs), the profiling time is higher since more data needs to be processed; however, a job needs to be profiled only once to predict the completion time for all resource tuples (i.e. the job-specific parameters only need to be determined once and then these can be inserted into the analytical expression, as described below).

To actually identify (or compute) the set of candidate resource combinations (in block 124), the resource element manager 106, 202, 502 uses MRCTE (or similar methodology) to determine the resource tuples that can achieve the completion time desired by the tenant and this involves two steps. First, the tenant job is profiled to determine infrastructure-specific and job-specific parameters (as described above). These parameters are then plugged into the analytical expression (e.g. as given above) to estimate the job's completion time when executed on a given resource tuple <N,B>. The latter operation is low overhead and may be repeated to explore the entire space for the two resources. In order to reduce the search space, the exploration may be limited, in reality, by the classes of internal network bandwidth that are offered by the provider. For example, where the provider offers only a few classes (e.g. 5-20 classes) of internal network bandwidth, the search space is reduced significantly which speeds up the second step. For each possible bandwidth class (i.e. for each value of B), the resource element manager 106, 202, 502 determines the number of compute instances (N) needed to satisfy the tenant goal. These <N,B> combinations are the set of candidate resource tuples (or candidate resource combinations) for the tenant request.

This particular MRCTE implementation, in a system such as shown in FIG. 2, has been evaluated through experiments, simulations and testbed deployment. Results indicate that MRCTE accurately determines the resources required to achieve tenant goals with low overhead and a maximum average prediction error of 9%. This prediction accuracy may be improved with more detailed modeling and profiling; however, this impacts the time taken to perform the estimation and identify the set of candidate resource combinations. Alternatively, the prediction errors may be taken into consideration by the resource element manager 106, 202, 502 by actually estimating the resources required to complete a tenant job in, for example, 90% of the completion time specified in the user's high level constraint. The results further show that capitalizing on resource malleability reduces the number of requests which have to be rejected (e.g. a provider can accept 3-21% more requests) and significantly improves datacenter goodput (e.g. by 6-93%), which may be defined as the sum of input data consumed across all requests and therefore represents the total useful work in the datacenter. The increase in goodput is due in part to the fact that bigger (i.e. more resource intensive) requests can be accepted.

There are many ways in which the cost computation and cost models described above with reference to FIG. 5 may be modified or extended. In a first example, a tenant may be offered additional options in the form of resource combinations which offer performance that exceeds the high level constraint specified in the tenant request (and hence are still reasonable options to the tenant). In such instances, the data which is presented to the user (in block 126 or 606) which relates to each candidate resource combination includes cost information and performance information (e.g. completion time). For example, where a tenant requests an application completion time of no more than 3 hours, the set of tuples for which related data is presented to the user may include a number of tuples that would result in an application completion time of close to 3 hours (but still no more than 3 hours) and also one or more tuples with a shorter application completion time, for example, 2 hours and 2.5 hours. As the tenant is also provided with both cost and performance information for each tuple, the tenant can choose whether any additional cost associated with the additional performance is justifiable and select an option which meets their needs (both in terms of cost and performance). In other examples, the set of tuples for which related data is presented to the user may include a number of tuples that would result in an application completion time of more to 3 hours and in such cases the cost may be reduced (because of the extended completion time) and so may still be of interest to the tenant.

Where cost information for multiple different candidate resource combinations is presented to the tenant (in block 126 or 606) in order that the tenant can make an informed decision when selecting a single resource combination, the cost information and cost model used may be tailored to achieve different goals. In one example described above, the different options and prices may reflect different levels of performance which are being offered to the tenant (where the minimum level of performance meets the high level constraint specified by the tenant). In another example described above, the different prices for different candidate resource combinations are intended to influence the choice made by the tenant and to encourage the tenant to select an option which is close to optimum for the provider.

In another example variation on the methods described above, the resource manager element (e.g. the performance prediction component 204) may explore resource combinations which exploit other dimensions such as time. For example, given a user request that specifies a performance-oriented goal, e.g. the application must be completed within 3 hours, the job profiling (e.g. in block 124) may consider both starting the application now, at $t_0$, and completing the application before $t_0+3$ hours, and also starting the application after a delay $\Delta t$ (i.e. starting at $t_0+\Delta t$) and still completing the application before $t_0+3$ hours (i.e. such that the application must now be completed within a period of 3 hours−$\Delta t$). By evaluating the metric for resulting candidate resource combinations, the relative benefits to the provider may be assessed and this may be used to select an optimum resource combination automatically (e.g. in block 125) or to price options differently when they are presented to the tenant (in blocks 126 and 606).

Exploration which involves time may also assist the provider where a request cannot otherwise currently be resourced, as a result of the current state of the datacenter. In such an instance, the resource manager element (e.g. the performance prediction component 204) may explore options where the application start is delayed until a point in time that there are resources available and resource combinations are identified which still meet the tenant's high level constraint. For example, where the datacenter is at or near capacity currently and is predicted to remain so for the next 45 minutes, an application start may be delayed by one hour and then the application may be resourced so that it can be completed within 2 hours, such that a tenant's high level constraint that the application needed to be completed within 3 hours is still satisfied. Such methods provide additional flexibility to the provider and increase the efficiency of the datacenter.

Although the description above refers to precise sets of candidate resource combinations, such as $<N_1,B_1>$, $<N_2,B_2>$, ..., $<N_n,B_n>$ where n is an integer, in some examples, the set of candidate resource combinations may alternatively be specified in terms of ranges that a particular resource value, such as the number of VMs, can take. These may be written in the form of one or more constraint tuples, for example:

$$<(x<N<y),(a<B<b)>$$

where x and y are the limits of the values that can be taken by N and a and b are the limits of the values that can be taken by B. Alternatively, the ranges that particular resource parameters (which may include time, such as start time or delay in start time) may take may be written in any other form.

Figure 8:
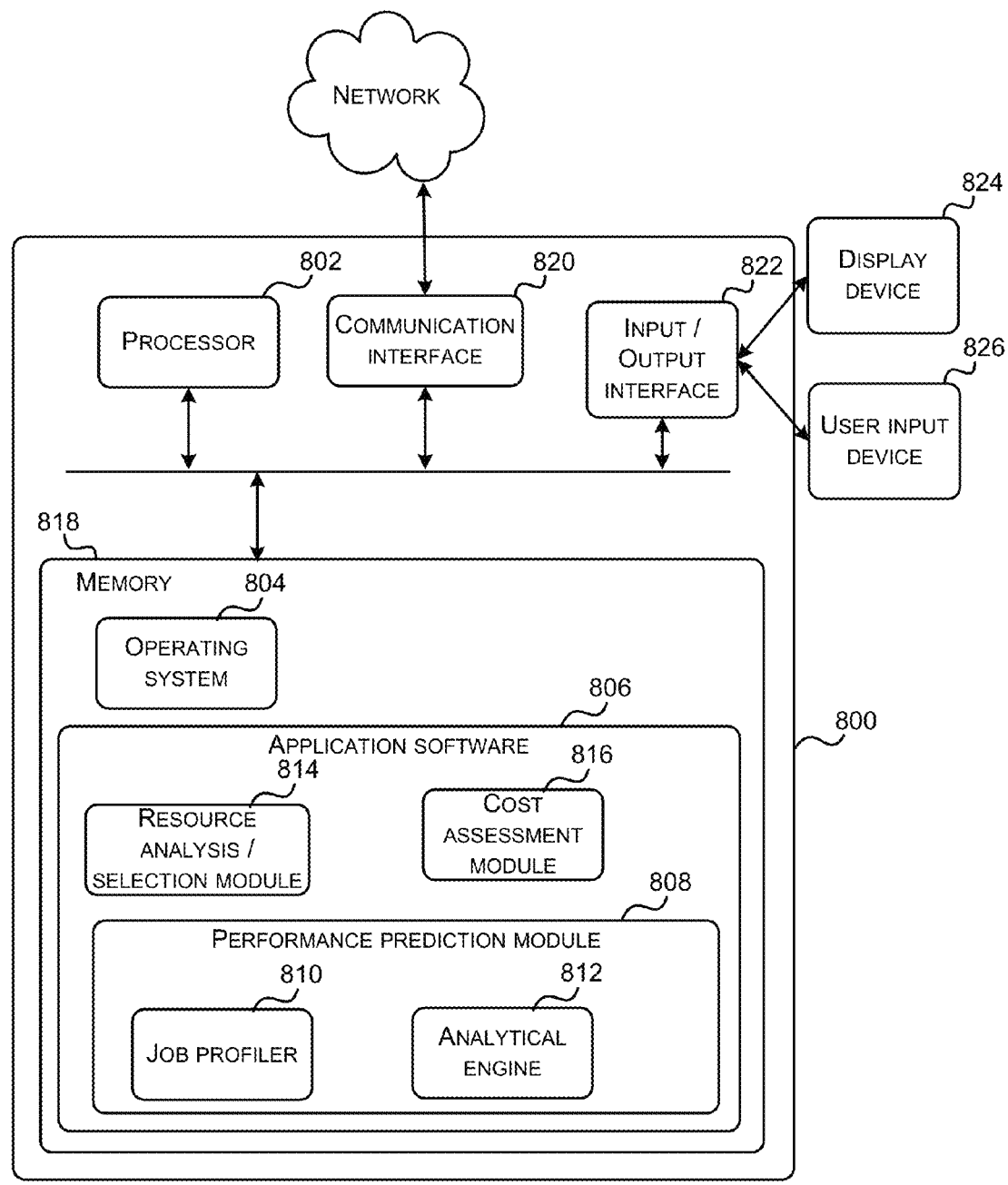
FIG. 8 illustrates an exemplary computing-based device in which embodiments of the methods described herein may be implemented.

FIG. 8 illustrates various components of an exemplary computing-based device 800 which may be implemented as any form of a computing and/or electronic device, and in which embodiments of the methods described above may be implemented. In particular, the computing-based device 800 may operate as a resource manager element 106, 202, 502 or as an element within a resource manager element.

Computing-based device 800 comprises one or more processors 802 which may be microprocessors, controllers or any other suitable type of processors for processing computer executable instructions to control the operation of the device in order to perform resource management for a multi-resource, multi-tenant datacenter, as described above. In some examples, for example where a system on a chip architecture is used, the processors 802 may include one or more fixed function blocks (also referred to as accelerators) which implement a part of the method of resource management (e.g. computation of Goodness values or other metrics) in hardware (rather than software or firmware). Platform software comprising an operating system 804 or any other suitable platform software may be provided at the computing-based device to enable application software 806 to be executed on the device. The application software may include a performance prediction module 808 which provides the functionality of the performance prediction component 204 (as shown in FIGS. 2 and 5 and described above). This module 808 may comprise two elements: a job profiler 810 and an analytical engine 812 which uses the parameters determined by the job profiler to search the resource space and identify candidate resource combinations. The application software may further include a resource analysis/selection module 814 and a cost assessment module 816. The resource analysis/selection module 814 provides the functionality of the resource selection component 206 and/or the resource analysis component 504 (as described above) and the cost assessment module 816 provides the functionality of the cost assessment component 506 (as shown in FIG. 5 and described above).

The computer executable instructions may be provided using any computer-readable media that is accessible by computing based device 800. Computer-readable media may include, for example, computer storage media such as memory 818 and communications media. Computer storage media, such as memory 818, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 818) is shown within the computing-based device 800 it will be appreciated that the storage may be distributed or located remotely and accessed via a network or other communication link (e.g. using communication interface 820).

The communication interface 820 provides an interface to external systems and devices, such as the datacenter (where the resource manager element is external to the datacenter) and the tenant's client device and in different implementations may interface to different devices. This interface 820 may be used to receive the tenant request 112, 208 and to output the data relating to the candidate resource combinations 118, 214, 508 for presentation to the tenant. This interface may also be used to receive datacenter state information 212 and in some examples, to provide information on a selected candidate resource combination to the database.

The computing-based device 800 may also comprises an input/output interface 822 arranged to output display information to a display device 824 which may be separate from or integral to the computing-based device 800. The display information may provide a graphical user interface. The input/output interface 822 is also arranged to receive and process input from one or more devices, such as a user input device 826 (e.g. a mouse, keyboard, camera, microphone or other sensor). In some examples the user input device 826 may detect voice input, user gestures or other user actions and may provide a natural user interface. Where the resource element manager functionality is implemented on the tenant's local device, the computing-based device 800 is this device and in such an example, this user input device 826 may be used to receive input defining the high level constraint and the particular application (e.g. the particular data analytics job) which is to be performed. In such an example, the display device 824 is used to present the candidate resource combinations (and any associated information) to the tenant and the user input device 826 may also be used to receive an input selecting one of the candidate resource combinations displayed. In an embodiment the display device 824 may also act as the user input device 826, e.g. if it is a touch sensitive display device. The input/output interface 822 may also output data to devices other than the display device, e.g. a locally connected printing device (not shown in FIG. 8).

In various examples described above, the burden of predicting the amount of resources required to complete an application is removed from the tenants and instead can be computed based on knowledge of the current datacenter state. This can result in increased datacenter efficiency and usability, reduced tenant costs and increased provider revenues. Where some resources within a datacenter are shared, the methods and systems described herein move from a situation where tenants determine their own resource requirements in isolation, to a situation where decisions are made about resource combinations (whether automatically or by the tenant) based at least in part on information which reflects the activities of other tenants.

Although the present examples are described and illustrated herein as being implemented in a cloud-computing system, the system described is provided as an example and not a limitation. As those skilled in the art will appreciate, the present examples are suitable for application in a variety of different types of datacenters or distributed computing systems where there are multiple resources and multiple tenants or users. Furthermore, use of a particular resource combination (e.g. <N,B>) is by way of example only and other resource combinations may alternatively be used. As described above, MapReduce is one example of a data analytics job to which the methods described above may be applied and the methods and systems are more broadly applicable to other applications (e.g. three-tier web applications and HPC applications).

The methods described above enable the tenant and/or provider to exploit diversity within the datacenter (particularly for cloud-based implementations). In various examples, a provider can also exploit flexibility in time as well as flexibility in allocating actual resources. The terms 'tenant' and 'user' are used interchangeably in the description above to refer to the person or entity which submits the request to run an application on the datacenter.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program.

Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate, and any arrows shown in accompanying flow diagrams show just one possible order of the method steps. Additionally, individual blocks may be deleted from any of the methods without departing from the spirit and scope of the subject matter described herein. Aspects of any of the examples described above may be combined with aspects of any of the other examples described to form further examples without losing the effect sought.

Although many of the FIGs. show single or double ended arrows between elements of the system described herein, it will be appreciated that this provides one possible example of the flow of communications (e.g. data and/or control messages) between elements and in other examples, the communication between any two modules may be unidirectional (in either direction) or bi-directional.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
  receiving, by a datacenter provider, a user request comprising details of an application to be executed by a multi-resource, multi-tenant datacenter and a high level constraint associated with the application;
  mapping the user request to a set of different candidate resource combinations within the datacenter, each candidate resource combination specifying at least a number of virtual machines and a network bandwidth between virtual machines for executing the application to satisfy the high level constraint;
  presenting data relating to at least a subset of the candidate resource combinations to the datacenter provider to enable the datacenter provider to select one of the at least a subset of the candidate resource combinations to execute the application; and,
  selecting one of the at least a subset of the candidate resource combinations based on a value of a metric computed for each of the different candidate resource combinations, the metric describing an impact on the ability of the datacenter to accommodate subsequent requests after allocating the candidate resource combination based at least in part on an imbalance in utilization across all resources, wherein the imbalance is calculated as the summation of the square of the quotient of dividing the number of unallocated VM slots by the total number of VM slots and the square of the quotient of dividing unallocated outbound link capacity by the total outbound link capacity.

2. The method according to claim 1, further comprising:
  selecting the subset of the candidate resource combinations from the set of different candidate resource combinations,
  and wherein data relating to the selected subset of the candidate resource combinations is presented to the datacenter provider.

3. The method according to claim 2, wherein the subset comprises a single candidate resource combination and the method further comprising:
  sending a message to cause the selected candidate resource combination to be automatically allocated to the user for executing the application.

4. The method according to claim 1, further comprising:
  computing a cost to the user associated with each candidate resource combination; and
  wherein the data relating to a candidate resource combination comprises the computed cost to the user for the candidate resource combination.

5. The method according to claim 4, wherein the cost is computed based on a value of a metric computed for the candidate resource combination and wherein the metric describes an impact on the datacenter of allocating the candidate resource combination.

6. The method according to claim 1, further comprising:
  receiving a datacenter provider input selecting one of the candidate resource combinations presented to the datacenter provider; and
  sending a message to cause the selected candidate resource combination to be allocated to the user for executing the application.

7. The method according to claim 1, wherein the mapping is performed using datacenter state information.

8. The method according to claim 1, wherein mapping the user request to a set of different candidate resource combinations within the datacenter comprises:
  profiling the application using a sample of data on a sample machine to determine one or more parameters; and
  using an analytical model and the one or more parameters to identify the set of different candidate resource combinations which satisfy the high level constraint.

9. The method according to claim 1, wherein the high level constraint is defined in terms of at least one of performance and cost.

10. The method according to claim 1, wherein the candidate resource combination further comprises a time parameter.

11. A method comprising:
receiving, by a datacenter provider, a user request comprising details of an application to be executed by a multi-resource, multi-tenant datacenter and high level constraint associated with the application;
mapping the user request to a set of different candidate resource combinations within the datacenter, each candidate resource combination specifying a combination of datacenter resources for executing the application to satisfy the high level constraint;
presenting data relating to two or more candidate resource combinations to the datacenter provider, the data comprising a metric describing an imbalance of resources across the datacenter, the metric being calculated based at least in part on a summation of the square of the quotient of dividing the number of unallocated VM slots by the total number of VM slots and the square of the quotient of dividing unallocated outbound link capacity by the total outbound link capacity, presenting data relating to two or more candidate combinations enabling the datacenter provider to associate a price with each of the presented two or more candidate combinations; and,
presenting the data relating to two or more candidate combinations and the associated prices to the user, presenting the data relating to two or more candidate combinations and associated prices enabling the user to select one of the two or more candidate resource combinations to execute the application.

12. The method according to claim 11, further comprising:
selecting the two or more candidate resource combinations from the set of different candidate resource combinations.

13. The method according to claim 12, wherein the two or more candidate resource combinations is selected based on a value of a second metric computed for each of the different candidate resource combinations and wherein the second metric describes an impact on the datacenter of allocating a candidate resource combination.

14. The method according to claim 11, further comprising:
receiving a user input selecting one of the candidate resource combinations for which related data was presented to the user; and
sending a message to cause the selected candidate resource combination to be allocated to the user for executing the application.

15. The method according to claim 11, wherein mapping the user request to a set of different candidate resource combinations within the datacenter comprises:
profiling the application using a sample of data on a sample machine to determine one or more parameters; and
using an analytical model and the one or more parameters to identify the set of different candidate resource combinations which satisfy the high level constraint.

16. One or more storage media storing device-executable instructions that, when executed by a computing system, direct the computing system to perform steps comprising:
receiving a user request comprising details of a data analytics job to be performed by a datacenter and a high level constraint associated with the job;
mapping the user request to a set of different candidate resource combinations within the datacenter, each candidate resource combination specifying at least a number of virtual machines and a network bandwidth between virtual machines for executing the data analytics job to satisfy the high level constraint;
presenting data relating to two or more candidate resource combinations to the datacenter provider, the data comprising a metric describing an imbalance of resources across the datacenter, the metric being calculated based at least in part on a summation of the square of the quotient of dividing the number of unallocated VM slots by the total number of VM slots and the square of the quotient of dividing unallocated outbound link capacity by the total outbound link capacity, presenting including enabling the datacenter provider to associate a price with each of the presented two or more candidate combinations; and,
presenting the data relating to two or more candidate combinations and the associated prices to the user, presenting the data relating to two or more candidate combinations and associated prices enabling the user to select one of the two or more candidate resource combinations to execute the application.

17. The one or more storage media according to claim 16, wherein the steps further comprise:
computing a cost to the datacenter provider associated with each candidate resource combination, wherein the cost is computed based on a value of a second metric computed for the candidate resource combination and wherein the second metric describes an impact on the datacenter of allocating the candidate resource combination; and
wherein the data relating to each candidate resource combination comprises the computed cost to the datacenter provider.

18. The method according to claim 8, wherein the high level constraint comprises a time deadline and the profiling comprises considering starting the application immediately and starting the application after a delay.

19. The method according to claim 15, wherein the high level constraint comprises a time deadline and the profiling comprises considering starting the application immediately and starting the application after a delay.

* * * * *